US010069191B1

(12) United States Patent
Stieber et al.

(10) Patent No.: US 10,069,191 B1
(45) Date of Patent: Sep. 4, 2018

(54) RESONANT STRUCTURES FORMED BY BATTERY HOUSINGS

(71) Applicant: Amazon Technologies, Inc., Seattle, WA (US)

(72) Inventors: Marcel Colman Eric Stieber, Santa Clara, CA (US); Torgeir J. Lindborg, San Luis Obispo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 54 days.

(21) Appl. No.: 15/421,385

(22) Filed: Jan. 31, 2017

(51) Int. Cl.
| H01Q 1/48   | (2006.01) |
| H01Q 1/22   | (2006.01) |
| H04B 1/40   | (2015.01) |
| H04B 1/3883 | (2015.01) |
| H01Q 5/10   | (2015.01) |

(52) U.S. Cl.
CPC ......... *H01Q 1/2291* (2013.01); *H01Q 1/2208* (2013.01); *H01Q 1/48* (2013.01); *H01Q 5/10* (2015.01); *H04B 1/3883* (2013.01); *H04B 1/40* (2013.01); *H04M 2250/04* (2013.01); *H04M 2250/06* (2013.01)

(58) Field of Classification Search
CPC ...... H01Q 1/2208; H01Q 1/2291; H01Q 1/48; H01Q 5/10
See application file for complete search history.

(56) References Cited

U.S. PATENT DOCUMENTS

| 4,903,326 A     | *  | 2/1990  | Zakman | H01Q 1/243 343/702 |
| 2008/0244144 A1 | *  | 10/2008 | Choi   | G08C 17/02 710/303 |
| 2016/0277879 A1 | *  | 9/2016  | Daoura | H04W 4/008 |

* cited by examiner

*Primary Examiner* — Hoang Nguyen
(74) *Attorney, Agent, or Firm* — Eversheds Sutherland (US) LLP

(57) ABSTRACT

Systems, methods, and computer-readable media are disclosed for resonant structures formed by battery housings. In one embodiment, an example device may include a battery having a housing, a positive terminal, and a negative terminal, where the housing includes a conductive material. The device may include a controller and a wireless communication component. The device may include a first low pass filter connected to the positive terminal and the controller, the first low pass filter configured to pass battery current and to block radio frequency signals of a first frequency, a second low pass filter connected to the negative terminal and the controller, and a first high pass filter connected to the negative terminal and the wireless communication component, the first high pass filter configured to pass radio frequency signals of the first frequency and to block the battery current. The housing may be configured to resonate at the first frequency.

20 Claims, 7 Drawing Sheets

RESONANT STRUCTURES FORMED BY BATTERY HOUSINGS

BACKGROUND

Electronic devices may include components for wireless communication. For example, smartphones may include components to communicate data both through a WiFi network connection, as well as through a cellular network connection. In some instances, electronic devices may have small footprints or sizes, and may therefore have limited space for wireless communication components, such as antennae and the like. In such electronic devices, wireless communication capabilities may be desired, regardless of a size of the electronic device.

Figure 1:
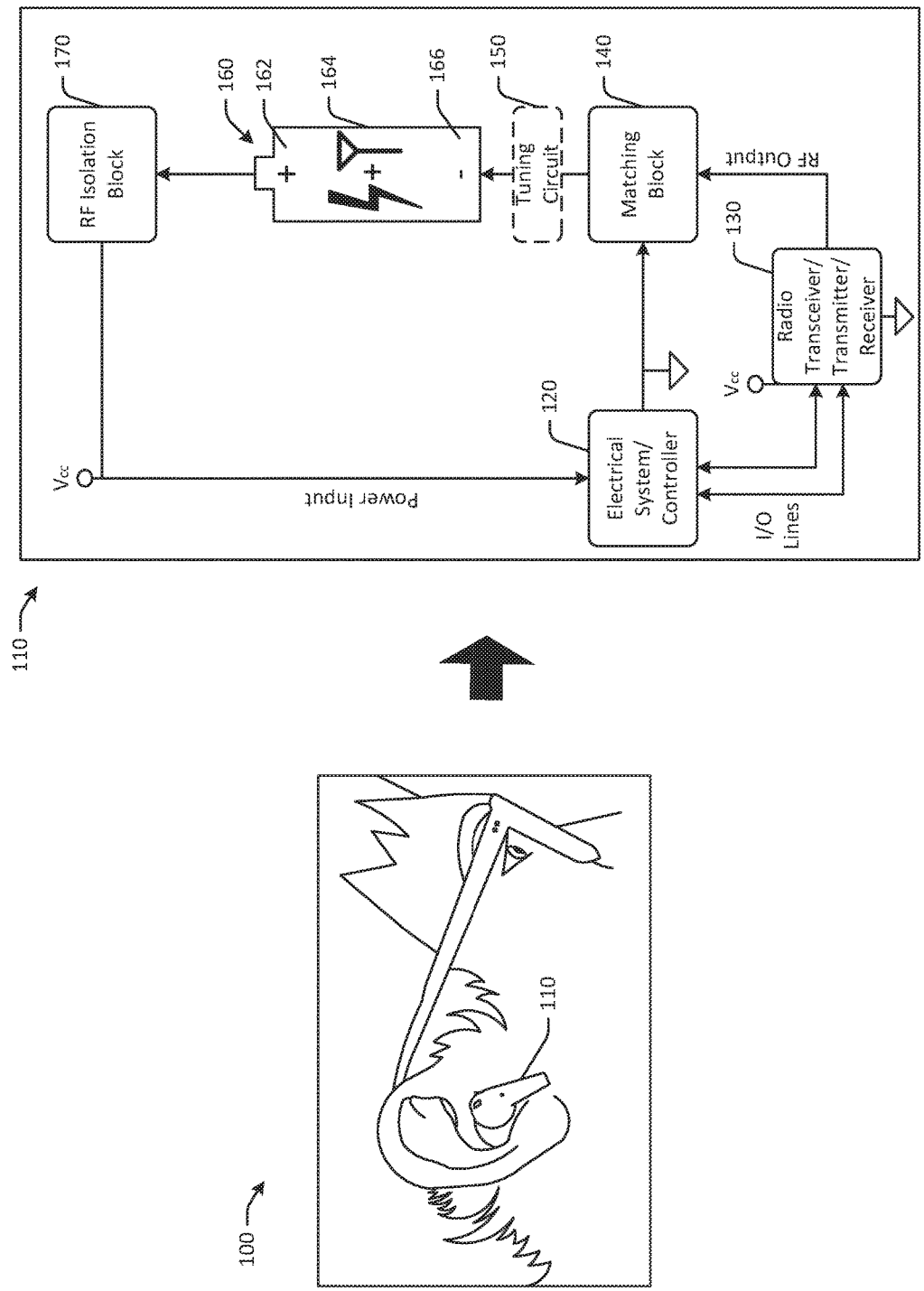
FIG. 1 is an example use case and schematic drawing of an electronic device with a battery housing that forms a resonant structure in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Electronic devices may be used to wirelessly send and receive data. For example, certain electronic devices, such as smartphones, tablets, laptop computers, and other mobile devices, may include one or more components that can be used to wirelessly communicate over one or more networks. For wireless communication, electronic devices may use certain components, such as radios, transceivers, antennae, and/or other components. Certain electronic devices may be small in size or may have small footprints, and may therefore have limited space (internal or external) in which electronic components are placed. However, wireless communication capabilities for such devices may be desired.

Embodiments of the disclosure include batteries with housings that form resonant structures. Such batteries may be used in electronic devices, where the battery housing acts or serves as a wireless communication antenna for the electronic device. As a result, a separate antenna may not be needed in the device, thereby reducing a number of components and/or an amount of space consumed by electronic components of the electronic device. Electronic devices may therefore have a reduced footprint, while maintaining wireless communication capabilities.

Certain electronic devices may be configured to communicate over different wireless communication protocols, such as via a WiFi connection and an RFID connection, in which case an antenna may be included in the electronic device for one of the wireless communication protocols, such as the WiFi communication protocol, while the battery housing serves as the antenna for the RFID communication protocol.

Batteries of the disclosure may be any suitable battery, such as an alkaline primary cell battery, and may have exterior casings or housings. The housings may be used as a driven element of an antenna system when the housing is connected to a transceiver of an electronic device. In some embodiments, the battery housings may form an integrated antenna, or may otherwise act as an antenna for the electronic device. Electronic devices may therefore include wireless communication capabilities while maintaining reduced or small footprints, as well as relatively small internal spaces for electronic components.

This disclosure relates to, among other things, systems, methods, computer-readable media, techniques, and methodologies for resonant structures formed by battery housings. Embodiments may include batteries with housings that may serve as antennae for wireless communication. Such embodiments may eliminate separate antenna that may otherwise be positioned within an electronic device.

Referring to FIG. 1, an example environment 100 with a device 110 is illustrated in accordance with one or more embodiments of the disclosure. The device 110 may be configured to communicate wirelessly with one or more other devices over one or more networks. For example, the device 110 may be an Internet of Things (IoT) device, a product ordering button or device, a home sensor, an aging in place device, an earphone, a speaker device, or another device. In the example of FIG. 1, the device 110 may be an earphone configured to provide audio content. The device 110 may have a relatively small footprint, as well as limited internal space within a housing of the device 110. The device 110 may be powered by one or more batteries. As shown in FIG. 1, the device 110 may use a battery housing of a battery as an antenna for wireless communication, thereby eliminating the need for a separate wireless antenna. The battery of the device 110 may facilitate wireless communication, and the device 110 may therefore maintain a relatively small form factor and/or footprint.

The device 110 may include an electrical system 120 with a controller, a radio transceiver/transmitter 130, a matching block 140, an optional tuning circuit 150, a battery 160, and a radio frequency (RF) isolation block 170. The electrical system 120 may be powered by and/or electrically coupled to the battery 160. The electrical system 120 may control operation of the device 110. For example, the electrical system 120 may include a controller or microcontroller that facilitates execution of computer-executable code and/or sends or receives wireless communications. Some embodiments may include a system ground that is connected to the controller and/or the wireless communication component. For example, the electrical system 120 may determine that a button on the device 110 has been pushed, and may wirelessly send an indication of the button being pushed to another device or server. The button press may indicate that volume is to be increased, or a subsequent song is to be played, etc. In other embodiments, button presses may indicate that an order is to be placed, for example, for a certain product or service, such as orange juice.

The device 110 may include the radio transceiver/transmitter 130. In some embodiments, the device 110 may include only a receiver, only a transmitter, or a transceiver. In some embodiments, the radio transceiver/transmitter 130 may be a writeable RFID receiver. The radio transceiver/transmitter 130 may be configured to facilitate wireless communication for the device. The radio transceiver/transmitter 130 may be coupled to the electrical system 120 via one or more input/output (IO) lines, which may be used for instructions or data transfer between the electrical system 120 and/or the controller and the radio transceiver/transmitter 130. The radio transceiver/transmitter 130 may be electrically coupled to and/or powered by the battery 160, and may be grounded by the electrical system 120. Other embodiments may include any suitable wireless communication component, such as at least one of a transmitter, a receiver, and/or a transceiver.

The radio transceiver/transmitter 130 may output one or more radio frequency signals having a certain frequency. For example, the radio transceiver/transmitter 130 may be configured to output data over a WiFi radio frequency, an RFID radio frequency, a Bluetooth radio frequency, a ZigBee radio frequency, a Near Field Communication radio frequency, or another radio frequency.

The RF output from the radio transceiver/transmitter 130 may be directed to the matching block 140. The matching block 140 may be grounded via an electrical coupling to the electrical system 120. The matching block 140 may be a high pass filter and may act to block direct current (DC), while allowing radio frequency signals of one or more predetermined frequencies to pass through the matching block 140. The one or more predetermined frequencies may be the same frequency as the radio frequency signal output by the radio transceiver/transmitter 130. The matching block 140 may therefore preserve or improve the RF signal output from the radio transceiver/transmitter 130 for transmission. In some instances, the matching block 140 may preserve or improve an RF signal that is received by the device 110 and is being sent to the radio transceiver/transmitter 130. The matching block 140 may be positioned between (e.g., connected to with one or more terminals, etc.) the radio transceiver/transmitter 130 and the negative terminal 166. In some instances, the matching block 140 may be positioned between the optional tuning circuit 150 and the radio transceiver/transmitter 130. The matching block 140 may be positioned between the electrical system 120 and the negative terminal 166.

The optional tuning circuit 150 may be configured to improve power transfer between the radio transceiver/transmitter 130 and the battery 160 by matching an impedance of the radio transceiver/transmitter 130 to that of the battery housing (which acts as the antenna) in the example of FIG. 1.

The battery 160 may include a housing 164, a positive terminal 162, and a negative terminal 166. The housing 164 may be formed at least partially of, or entirely of, a conductive material. The battery 160 may be an alkaline battery and may have any suitable form factor, such as a button cell battery, a block battery, and may be of any suitable size. The housing 164 of the battery 160 may be a resonant structure that resonates at a predetermined frequency, and therefore serves as an antenna for the device 110. For example, the housing 164 may be configured to resonate at a frequency of 900 MHz, 2.4 GHz, 5.8 GHz, or another frequency. The housing 164 may resonate in response to the RF output from the radio transceiver/transmitter 130, and/or during receipt of wireless communications from another device. The frequency at which the housing 164 resonates may be a function of, in some embodiments, a size of the housing 164 (e.g., a surface area of the housing, a length and width of the housing, etc.). In some embodiments, certain features may be included as part of the battery housing 164 that may impact or affect the frequency at which the housing resonates, such as slots or openings in the housing, flexible antenna attachments, and other features. Example battery housing configurations and sizes include rectangular housings, cylindrical housings, button cell housings, and sizes such as AA, AAA, C, D, 4.5V, 9V, CR, SR, and other batteries.

The RF isolation block 170 may be positioned between the positive terminal 162 and the electrical system 120 and/or the radio transceiver/transmitter 130. The RF isolation block 170 may be a low pass filter and may be configured to block radio frequency signals of one or more predetermined frequencies. In some instances, the RF isolation block 170 may be configured to block signals having the radio frequency that is allowed to pass by the matching block 140. As a result, the RF isolation block 170 may prevent RF signals from escaping from the battery 160 and/or affecting other portions of the device 110, such as the radio transceiver/transmitter 130 or the electrical system 120.

Accordingly, the device 110 may wirelessly communicate with other devices using the housing 164 as an antenna for the system. The housing 164 may resonate, and the RF signal output from the radio transceiver/transmitter 130 may be wirelessly transmitted or sent to another device.

Figure 2:
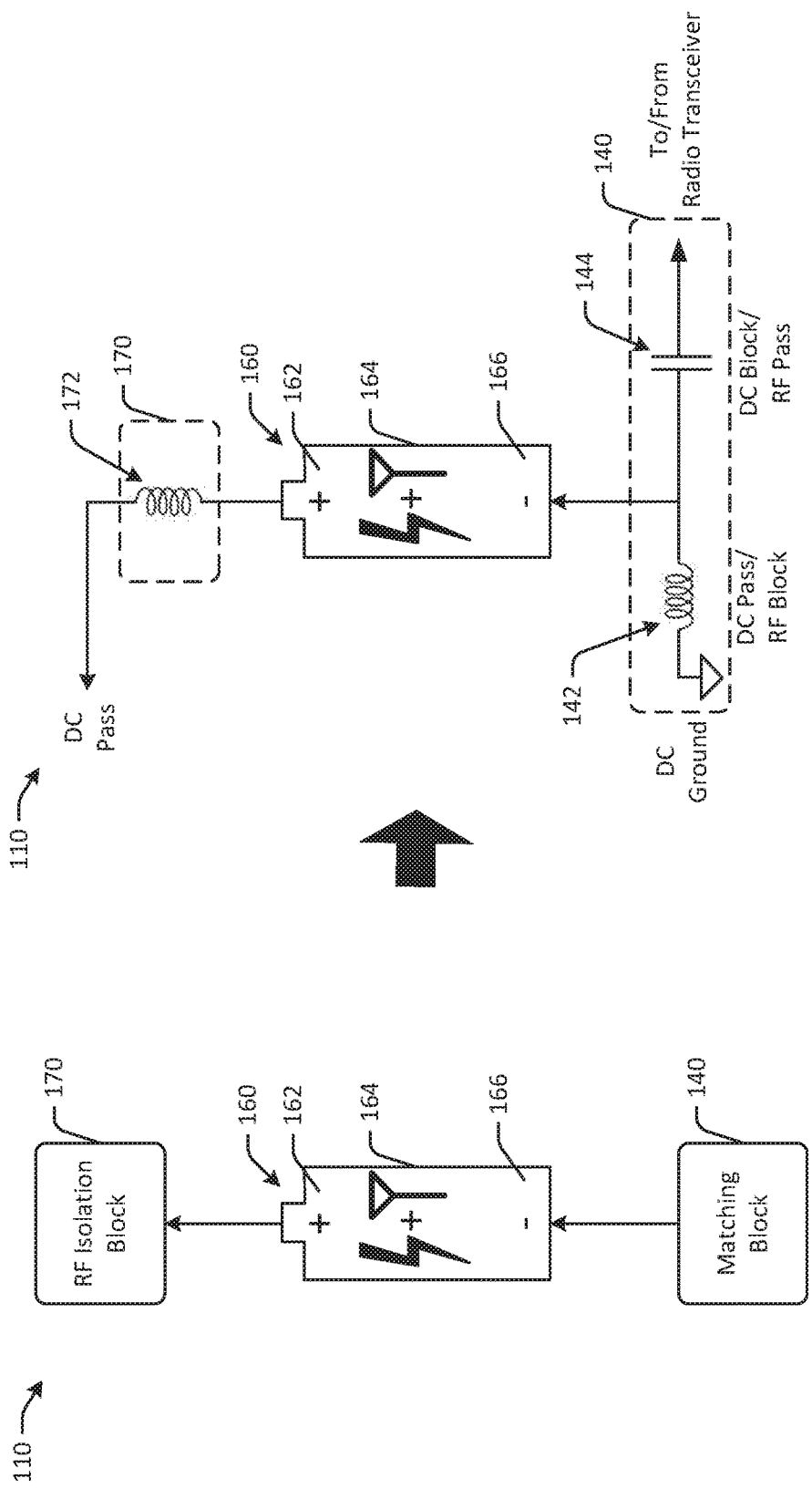
FIG. 2 is a schematic drawing of a portion of the electronic device of FIG. 1 in accordance with one or more embodiments of the disclosure.

FIG. 2 schematically illustrates a portion of FIG. 1 in detail. Specifically, one embodiment of the matching block 140 is illustrated in FIG. 2. The matching block 140 may include an RF choke, a filter network, an inductor 142 (or any other suitable low pass filter methods) configured to block radio frequency signals of a certain frequency, while allowing direct current to pass. The inductor 142 may therefore allow current to be directed to the battery 160, while preventing radio frequency signals of a certain frequency from interfering with the RF signal output of the radio transceiver/transmitter 130. The inductor 142 may be electrically coupled to a DC ground, for example, at the electrical system 120.

The matching block 140 may include a capacitor 144 that is configured to block direct current, while allowing signals of one or more frequencies to pass, such as the RF output from the radio transceiver/transmitter 130. The direct current may therefore be prevented from interfering with the RF signal output of the radio transceiver/transmitter 130. Accordingly, RF signals either to the radio transceiver/ transmitter 130 or from the radio transceiver/transmitter 130 may be routed through the capacitor 144.

The RF isolation block 170 may include an RF choke or an inductor 172 that is configured to block signals having one or more frequencies, such as a frequency of the radio transceiver/transmitter 130 output, while allowing direct current to pass through the inductor 172. Radio frequency signals may therefore be prevented from escaping from or exiting the battery 160 or the housing 164 and entering other portions of the device 110 and/or causing interference. In some embodiments, the inductor 172 at the RF isolation block 170 may have the same configuration as the inductor 142 at the matching block, while in other embodiments, the respective configurations may be different.

Example embodiments of the disclosure provide a number of technical features or technical effects. For example, in accordance with example embodiments of the disclosure, certain embodiments of the disclosure may include batteries with conductive housings, where the conductive housings are configured to resonate at certain frequencies, thereby acting as an antenna for an electronic device. As a result, a separate antenna may not be needed by the electronic device for wireless communication, and device form factors and/or footprints may be maintained or reduced. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
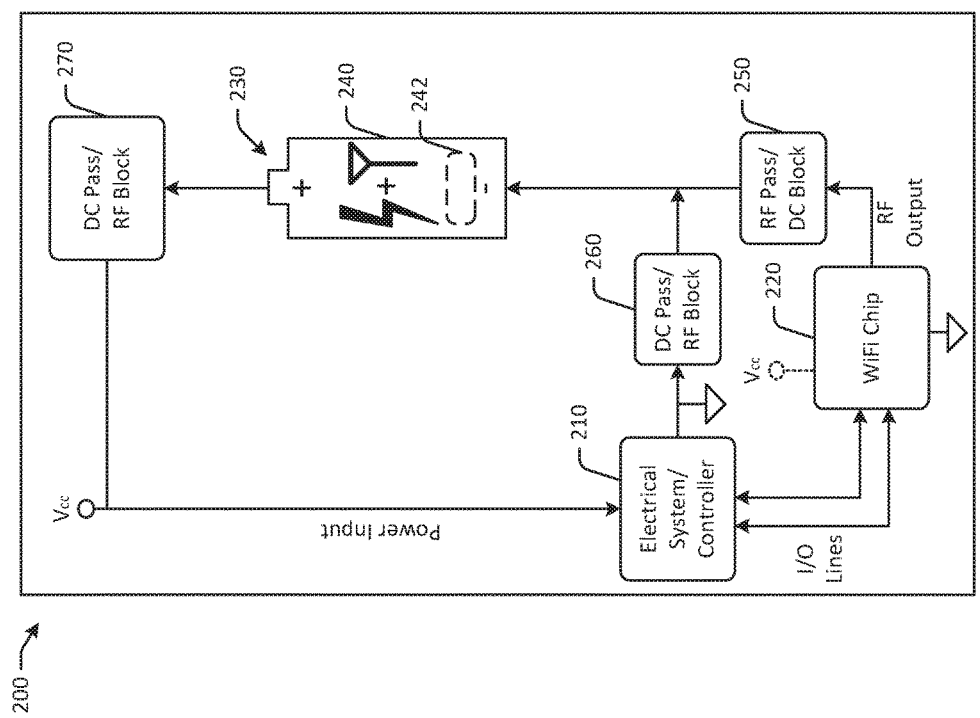
FIG. 3 is a schematic drawing of an electronic device with a battery housing that forms a resonant structure in accordance with one or more embodiments of the disclosure.

Referring to FIG. 3, a schematic drawing of an electronic device 200 with a battery housing that forms a resonant structure is depicted in accordance with one or more embodiments of the disclosure. The electronic device 200 may be any suitable electronic device, such as a camera device, a mobile device, a television device, a speaker device, a wearable device, another relatively small device, or a device with limited internal space.

The electronic device 200 may include an electrical system 210 having a controller or at least one processor, a wireless communication component such as a WiFi chip 220, and a battery 230. The battery 230 may have a housing 240, a positive terminal, and a negative terminal. The electrical system 210 may control operation of the electronic device 200 and may be coupled to the WiFi chip 220 via one or more I/O lines. The WiFi chip 220 may be configured to send and/or receive data over a WiFi network.

The electronic device 200 may be configured to send and/or receive wireless communications. For example, the WiFi chip 220 may be used in conjunction with the housing 240 to send and/or receive data. In one embodiment, the WiFi chip 220 may include a WiFi radio that can be used in conjunction with the housing 240 to send and/or receive data over a WiFi network. The WiFi chip 220 may be a fully integrated System-on-Chip in some embodiments.

The battery 230 may be configured to power one or more components of the electronic device 200, such as the electrical system 210 and/or the WiFi chip 220. The housing 240 may be a resonant structure that is configured to act as an antenna for the electronic device 200 and may be coupled to the WiFi chip 220. The housing 240 may be at least partially formed of a conductive material. The WiFi chip 220 may be configured to output radio frequency signals of a certain radio frequency, and the housing 240 may be configured to resonate at the same frequency. The electronic device 200 may therefore be configured to send and/or receive data using the housing 240.

The electronic device 200 may include one or more low pass filters and/or one or more high pass filters. For example, the electronic device 200 may include a first low pass filter 270 positioned between the positive terminal of the battery 230 and the controller or electrical system 210. The first low pass filter 270 may be configured to pass battery current and to block signals of one or more frequencies. For example, the first low pass filter 270 may be configured to block a radio frequency signal of a frequency that is output by the WiFi chip 220. In some embodiments, the first low pass filter 270 may be an inductor or an RF choke.

The electronic device 200 may include a second low pass filter 260 positioned between the negative terminal of the battery 230 and the controller or electrical system 210. The second low pass filter 260 may be configured to pass the current and to block signals of one or more frequencies. The second low pass filter 260 may be configured to block the same frequency as the first low pass filter 270 or a different frequency. In some embodiments, the second low pass filter 260 may be an inductor or an RF choke.

The electronic device 200 may include a first high pass filter 250 positioned between the negative terminal of the battery 230 and the wireless communication component or the WiFi chip 220. The first high pass filter 250 may be configured to pass the same one or more frequencies as the first low pass filter 270 and/or second low pass filter 260, which may be the same frequency output by the WiFi chip 220, or another frequency. The first high pass filter 250 may be configured to block current (e.g., battery current, etc.), while allowing, in some embodiments, signal current to pass. In some embodiments, the first high pass filter 250 may be a capacitor. The second low pass filter 260 and the first high pass filter 250 may be coupled to the battery in parallel. In particular, the second low pass filter 260 and the first high pass filter 250 may be coupled to the negative terminal of the battery in parallel.

In some embodiments, the electronic device 200 may include one or more inductors, or at least two inductors, positioned between the electrical system 210 and the battery 230. For example, in FIG. 3, the first low pass filter 270 and the second low pass filter 260 may be inductors.

The housing 240 of the battery 230 may include an optional slot 242. For example, the optional slot 242 may be formed in the housing 240, and the wireless communication component or the WiFi chip 220 may be coupled to an edge of the slot 242. The slot 242 may affect the frequency at which the housing 240 resonates. The slot 242 may be positioned at a suitable location along the housing 240, and may be dimensioned differently so as to achieve the desired impact on the resonation frequency. In embodiments with slots, a coax may be spot welded or otherwise attached to a portion or edge of the slot.

Figure 4:
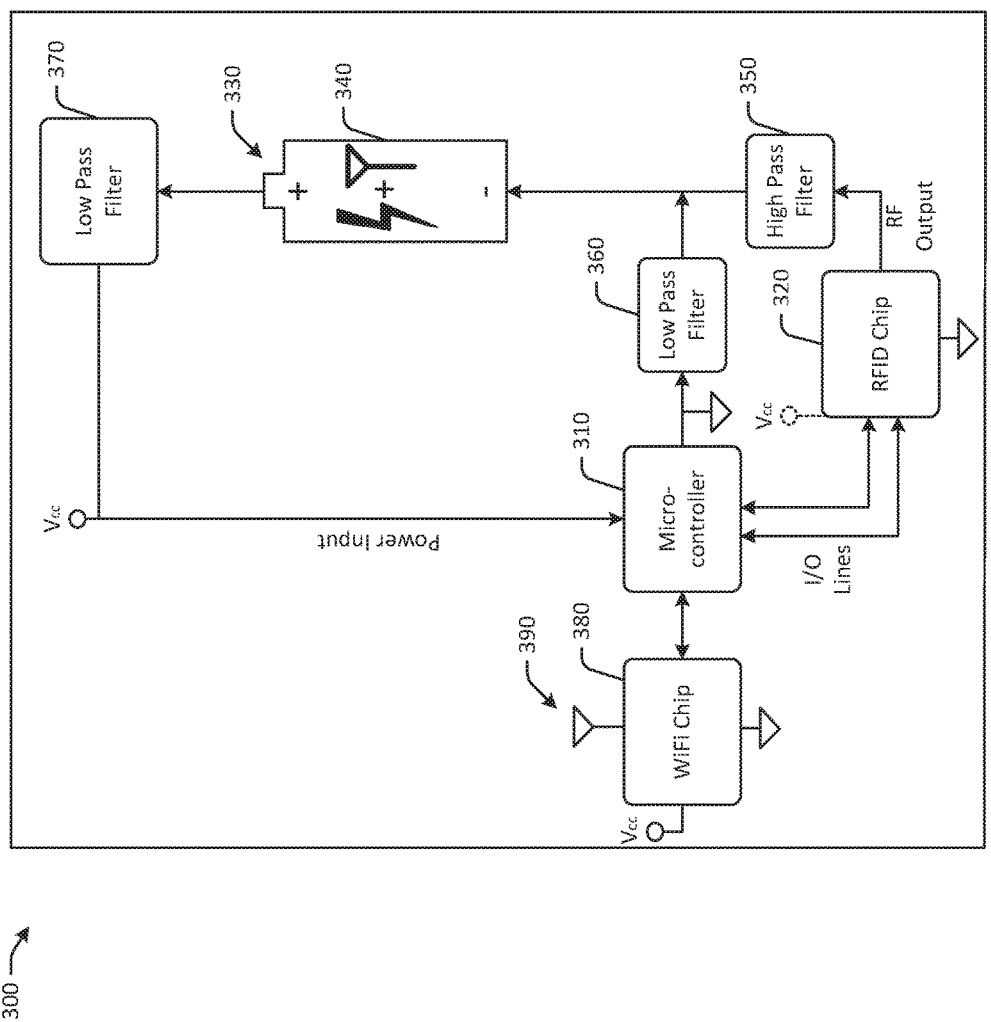
FIG. 4 is a schematic drawing of an electronic device with two wireless communication components and a battery housing that forms a resonant structure in accordance with one or more embodiments of the disclosure.

FIG. 4 is a schematic drawing of an electronic device 300 with two wireless communication components and a battery housing that forms a resonant structure in accordance with one or more embodiments of the disclosure. Certain devices may include multiple wireless communication components, such as multiple wireless radios or transceivers. For example, in FIG. 4, the electronic device 300 may be configured to wirelessly communicate over both a WiFi communication protocol and a radio frequency identification (RFID) communication protocol. In such instances, the electronic device 300 may use a battery housing as an antenna for one of the wireless communication protocols, and may include a separate antenna for the other wireless communication protocol.

For example, in FIG. 4, the electronic device 300 may include a microcontroller 310, an RFID chip 320, a battery 330 with a conductive housing 340, and a WiFi chip 380. The RFID chip 320 may be configured to output a radio frequency signal having a certain frequency. Output from the RFID chip may pass through a high pass filter 350 and may be routed to the conductive housing 340. The high pass filter 350 may allow the radio frequency signal output from the RFID chip 320 to pass, while blocking direct current flow. The conductive housing 340 may resonate at the frequency of the radio frequency signal output of the RFID chip 320 to facilitate wireless communication.

A first low pass filter 360 may be positioned between the microcontroller 310 and the negative terminal of the battery 330. The first low pass filter 360 may be configured to block signals of a certain frequency, such as the frequency of the radio frequency signal output by the RFID chip 320, while allowing direct current to pass. A second low pass filter 370 may be positioned between the positive terminal of the battery 330 and the microcontroller 310, and may be configured to block signals of a certain frequency, such as the frequency output by the RFID chip 320, while allowing direct current to pass.

The WiFi chip 380 may be electrically coupled to the microcontroller 310, and may be used for communication over a WiFi network instead of, or in addition to, the RFID communication provided by the RFID chip 320. The WiFi chip 380 may output frequencies that are different than that of the RFID chip 320, and as a result, may not be compatible with using the housing 340 as an antenna. The electronic device 300 may therefore include a separate WiFi antenna 390 that facilitates WiFi communications sent and/or received by the electronic device 300. Certain embodiments may therefore be configured to communicate over a plurality of wireless communication protocols. While FIG. 4 illustrates two wireless communication chips, other embodiments may include more wireless communication chips and/or antennae.

Figure 5:
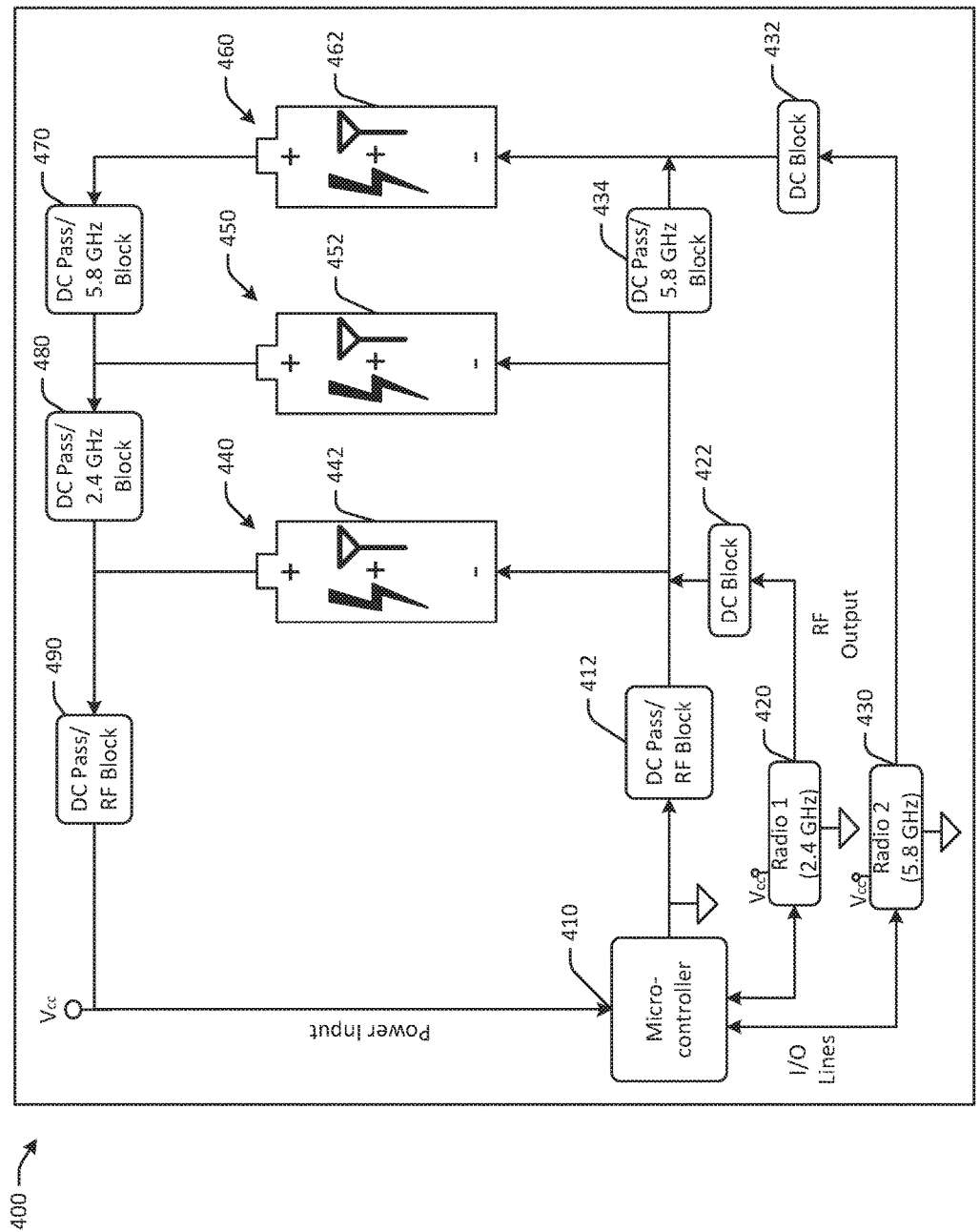
FIG. 5 is a schematic drawing of an electronic device with two wireless communication components and multiple battery housings that form resonant structures in accordance with one or more embodiments of the disclosure.

FIG. 5 is a schematic drawing of an electronic device 400 with two wireless communication components and multiple battery housings that form resonant structures in accordance with one or more embodiments of the disclosure. Certain electronic devices may include a plurality of batteries with housings. Such devices may use different battery housings as antennas for different frequencies.

For example, FIG. 5 includes a microcontroller 410, a first radio 420, and a second radio 430. The first radio 420 may be configured to output a signal having a first radio frequency, which may be 2.4 GHz, and the second radio 430 may be configured to output a signal having a second radio frequency, which may be 5.8 GHz. The first radio 420 and the second radio 430 may be coupled to the microcontroller 410 via respective I/O lines. In other embodiments, the radios may output different frequencies.

The electronic device 400 may include a first battery 440 having a first housing 442, a second battery 450 having a second housing 452, and a third battery 460 having a third housing 462. Other embodiments may include additional or fewer batteries. The first battery 440, second battery 450, and third battery 460 may be coupled to the microcontroller 410 is a parallel connection or in a series connection.

A first low pass filter 412 may be positioned between the microcontroller 410 and the batteries 440, 450, 460. The first low pass filter 412 may be configured to allow current to pass while blocking one or more frequencies. For example, in FIG. 5, the first low pass filter 412 may be configured to block frequencies of 2.4 GHz and 5.8 GHz. In other embodiments, the first low pass filter 412 may be configured to block one or more different frequencies.

RF signal output from the first radio 420 may be directed through a first current block component 422 (e.g., a capacitor, etc.) that may be configured to block current while allowing one or more frequencies to pass. For example, the first current block component 422 may be configured to allow a 2.4 GHz frequency to pass. The first current block component 422 may be a high pass filter.

RF output from the first radio 420 may pass through the first current block component 422 and may be directed to the first housing 442 and/or the second housing 452. The first housing 442 and the second housing 452 may resonate at the frequency of the RF output from the first radio 420, such as 2.4 GHz, and may therefore act as antennae for the first radio 420.

A first filtering component 480 configured to block a frequency of the RF output of the first radio 420 (e.g., 2.4 GHz) and allow current to pass may be positioned between a positive terminal of the second battery 450 and a positive terminal of the first battery 440. The first filtering component 480 may be configured to prevent radio frequency interference created by the RF output from the first radio 420. The first filtering component 480 may be a low pass filter.

A second low pass filter 490 may be positioned downstream of the batteries 440, 450, 460, or in between the batteries 440, 450, 460 and the microcontroller 410. The second low pass filter 490 may be configured to allow current to pass while blocking one or more frequencies. For example, the second low pass filter 490 may be configured to block both 2.4 GHz and 5.8 GHz frequencies, or one of the two frequencies. The second low pass filter 490 may be a low pass filter.

A second filtering component 434 configured to block a frequency of the RF output of the second radio 430 (e.g., 5.8 GHz) and allow current to pass may be positioned between the microcontroller 410 and the third battery 460. In particular, the second filtering component 434 may be positioned between a second negative terminal of the second battery 450 and a third negative terminal of the third battery 460. The second filtering component 434 may be configured to prevent radio frequency interference with the RF output of the second radio 430 that may be created by the RF output from the first radio 420. The second filtering component 434 may be a low pass filter. In some embodiments, the second filtering component 434 may be positioned between the microcontroller 410 and the second negative terminal of the second battery 450.

RF output from the second radio 430 may be directed through a second current block component 432 (e.g., a capacitor, etc.) that may be configured to block current while allowing one or more frequencies to pass. For example, the second current block component 432 may be configured to allow 5.8 GHz frequency to pass. RF output from the first radio 420 may be filtered by the second filtering component 434 to reduce or prevent interference with the RF output from the second radio 430. The second current block component 432 may be a high pass filter.

RF output from the second radio 430 may pass through the second current block component 432 and may be directed to the third housing 462. The third housing 462 may resonate at the frequency of the RF output from the second radio 430, such as 5.8 GHz, and may therefore act as an antenna for the second radio 430.

A third filtering component 470 configured to block a frequency of the second radio 430 (e.g., 5.8 GHz) and allow current to pass may be positioned between a positive terminal of the third battery 460 and a positive terminal of the second battery 450. The third filtering component 470 may be configured to prevent radio frequency interference created by the RF output from the second radio 430. Accordingly, the first battery housing 442 and the second battery housing 452 may serve as antennae for the first radio 420, and the third battery housing 462 may serve as an antenna for the second radio 430.

Figure 6:
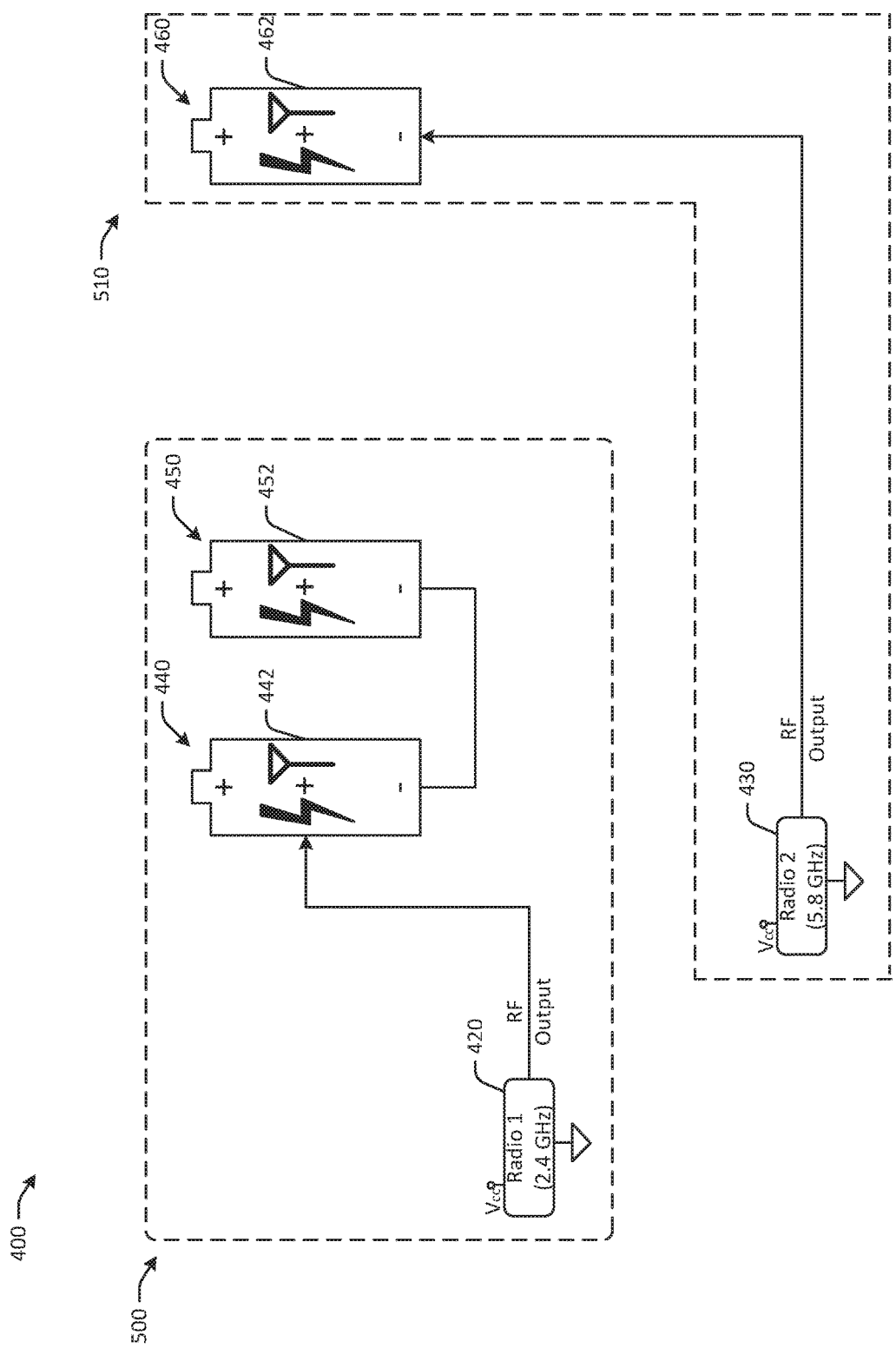
FIG. 6 is a schematic drawing of a portion of the electronic device of FIG. 5 illustrating effective antennae in accordance with one or more embodiments of the disclosure.

FIG. 6 is a schematic drawing of a portion of the electronic device of FIG. 5 illustrating effective antennae in accordance with one or more embodiments of the disclosure. As illustrated in FIG. 6, the first battery housing 442 of the first battery 440, and the second battery housing 452 of the second battery 450 effectively serve as antennae 500 for the first radio 420, and therefore resonate at a frequency of 2.4 GHz in the illustrated example. While FIG. 6 is a schematic illustration, in some embodiments, the first radio 420 may be coupled to a side portion of the first battery housing 442, as illustrated. In other embodiments, the first radio 420 may be coupled to both the negative terminals of the first battery 420 and the second battery 450 in parallel. The third battery housing 462 of the third battery 460 effectively serves as an antenna 510 for the second radio 430, and therefore resonates at a frequency of 5.8 GHz in the illustrated example. The device 400 may therefore not need separate antenna for the first radio 420 or the second radio 430.

One or more operations of the method, process flows, or use cases of FIGS. 1-6 may have been described above as being performed by a user device, or more specifically, by one or more program module(s), applications, or the like executing on a device. It should be appreciated, however, that any of the operations of methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
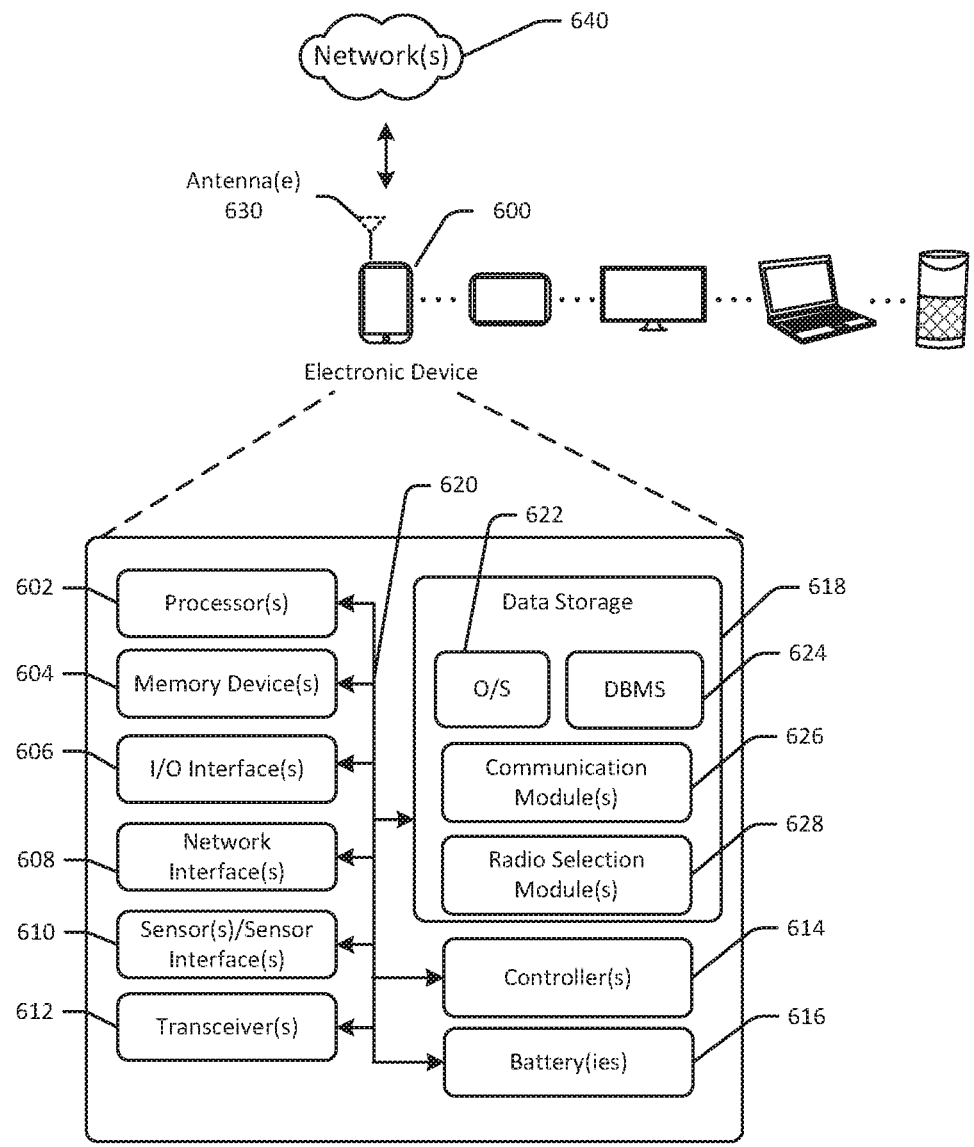
FIG. 7 schematically illustrates an example architecture of an electronic device in accordance with one or more embodiments of the disclosure.

FIG. 7 is a schematic block diagram of one or more illustrative electronic device(s) 600 in accordance with one or more example embodiments of the disclosure. The electronic device(s) 600 may include any suitable computing device including, but not limited to, a server system, a camera or camera system, a mobile device such as a smartphone, a tablet, an e-reader, a wearable device, a speaker device, or the like; a desktop computer; a laptop computer; a content streaming device; a set-top box; or the like. The electronic device(s) 600 may correspond to an illustrative device configuration for the electronic device(s) of FIGS. 1-6.

The electronic device(s) 600 may be configured to communicate via one or more networks with one or more servers, user devices, or the like. The electronic device(s) 600 may be configured to send and/or receive wireless communications using a battery housing as a resonant structure, or a battery housing that acts as an antenna for the electronic device(s) 600. The electronic device(s) 600 may be configured to select one or more wireless communication protocols, control operations of remote devices, such an internet of things devices, and other operations.

The electronic device(s) 600 may be configured to communicate via one or more networks 640. Such network(s) 640 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 640 may have any suitable communication range associated therewith and may include, for example, global networks (e.g., the Internet), metropolitan area networks (MANs), wide area networks (WANs), local area networks (LANs), or personal area networks (PANs). In addition, such network(s) 640 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 600 may include one or more processors (processor(s)) 602, one or more memory devices 604 (generically referred to in this section as memory 604), one or more input/output ("I/O") interfaces 606, one or more network interfaces 608, one or more sensors or sensor interfaces 610, one or more transceivers 612, one or more controllers 614, one or more batteries 616, and data storage 618. The electronic device(s) 600 may further include one or more buses 620 that functionally couple various components of the electronic device(s) 600. The electronic device(s) 600 may optionally include one or more antenna(e) 630 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, an RFID antenna, and so forth.

The bus(es) 620 may include at least one of a system bus, a memory bus, an address bus, or a message bus, and may permit the exchange of information (e.g., data (including computer-executable code), signaling, etc.) between various components of the electronic device(s) 600. The bus(es) 620 may include, without limitation, a memory bus or a memory controller, a peripheral bus, an accelerated graphics port, and so forth. The bus(es) 620 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the electronic device(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 618 may include removable storage and/or non-removable storage including, but not limited to, magnetic storage, optical disk storage, and/or tape storage. The data storage 618 may provide non-volatile storage of computer-executable instructions and other data. The memory 604 and the data storage 618, removable and/or non-removable, are examples of computer-readable storage media (CRSM) as that term is used herein.

The data storage 618 may store computer-executable code, instructions, or the like that may be loadable into the memory 604 and executable by the processor(s) 602 to cause the processor(s) 602 to perform or initiate various operations. The data storage 618 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to data storage 618 for non-volatile storage.

More specifically, the data storage 618 may store one or more operating systems (O/S) 622; one or more database management systems (DBMS) 624; and one or more program module(s), applications, engines, computer-executable code, scripts, or the like such as, for example, one or more communication module(s) 626 and/or one or more radio selection module(s) 628. Some or all of these module(s) may be or include sub-module(s). Any of the components depicted as being stored in data storage 618 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 618 may support the functionality described in reference to the corresponding components named earlier in this disclosure.

The data storage 618 may further store various types of data utilized by the components of the electronic device(s) 600. Any data stored in the data storage 618 may be loaded into the memory 604 for use by the processor(s) 602 in executing computer-executable code. In addition, any data depicted as being stored in the data storage 618 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, an example datastore(s) may include, for example, user account or user profile data, user device settings, user device preferences and authorizations, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the electronic device(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), Image Signal Processor (ISP), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 7, the communication module(s) 626 may include computer-executable instructions, code, or the like that responsive to execution by one or more of the processor(s) 602 may perform functions including, but not limited to, communicating with remote servers or devices, communicating with remote datastores, communicating with local servers or devices on an intranet, sending or receiving information and instructions, sending or receiving orders, and the like.

The radio selection module(s) 628 may include computer-executable instructions, code, or the like that responsive to execution by one or more of the processor(s) 602 may perform functions including, but not limited to, determining wireless communication protocols, selecting wireless chips for communication, managing incoming and/or outgoing data, and the like.

Referring now to other illustrative components depicted as being stored in the data storage 618, the O/S 622 may be loaded from the data storage 618 into the memory 604 and may provide an interface between other application software executing on the electronic device(s) 600 and the hardware resources of the electronic device(s) 600. More specifically, the O/S 622 may include a set of computer-executable instructions for managing the hardware resources of the electronic device(s) 600 and for providing common services to other application programs (e.g., managing memory allocation among various application programs). In certain example embodiments, the O/S 622 may control execution of the other program module(s) to dynamically enhance characters for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 618. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 600 is a mobile device, the DBMS 624 may be any suitable light-weight DBMS optimized for performance on a mobile device.

Referring now to other illustrative components of the electronic device(s) 600, the input/output (I/O) interface(s) 606 may facilitate the receipt of input information by the electronic device(s) 600 from one or more I/O devices as well as the output of information from the electronic device(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), micro-USB, FireWire, Thunderbolt, Ethernet port or other connection protocol that may connect to one or more networks. The I/O interface(s) 606 may also include a connection to one or more of the antenna(e) 630 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, a WiMAX network, a 3G network, a ZigBee network, etc.

The electronic device(s) 600 may further include one or more network interface(s) 608 via which the electronic device(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The optional antenna(e) 630 may include any suitable type of antenna depending, for example, on the communications protocols used to transmit or receive signals via the antenna(e) 630. Non-limiting examples of suitable antennae may include directional antennae, non-directional antennae, dipole antennae, folded dipole antennae, patch antennae, multiple-input multiple-output (MIMO) antennae, or the like. The antenna(e) 630 may be communicatively coupled to one or more transceivers 612 or radio components to which or from which signals may be transmitted or received.

As previously described, the antenna(e) 630 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 630 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 630 may be configured to transmit or receive radio frequency signals within any suitable frequency range forming part of the unlicensed portion of the radio spectrum.

The antenna(e) 630 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 630—transmitting or receiving radio frequency (RF) signals in the bandwidth and/or channels corresponding to the communications protocols utilized by the electronic device(s) 600 to communicate with other devices. The transceiver(s) 612 may include hardware, software, and/or firmware for modulating, transmitting, or receiving—potentially in cooperation with any of antenna(e) 630—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the electronic device(s) 600. The transceiver(s) 612 may further include a low noise amplifier (LNA), additional power signal amplifiers (PA), an analog-to-digital (A/D) converter, one or more buffers, a digital baseband, or the like.

The controller(s) 614 may be any microcontroller or microprocessor configured to control one or more operations of the electronic device(s) 600. The battery(ies) 616 may be any suitable battery configured to power the electronic device(s) 600. For example, the battery 616 may be an alkaline primary cell battery. The battery 616 may be coupled to the transceiver(s) 612 and may serve as a driven element of an antenna system, and/or may serve as the antenna(e) 630 of the electronic device(s) 600. The battery 616 may include a housing that acts as a resonant structure.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 7 as being stored in the data storage 618 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 600, and/or hosted on other computing device(s) accessible via one or more networks, may be provided to support the functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the electronic device(s) 600 may include alternate and/or additional hardware, software, or firmware components beyond those described or depicted without departing from the scope of the disclosure. More particularly, it should be appreciated that software, firmware, or hardware components depicted as forming part of the electronic device(s) 600 are merely illustrative and that some components may not be present or additional components may be provided in various embodiments. While various illustrative program module(s) have been depicted and described as software module(s) stored in the data storage 618, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, schematics, and use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A device comprising:
   a battery comprising a conductive housing, a positive terminal, and a negative terminal;
   a system ground coupled to the battery;
   a microcontroller;
   a wireless transceiver comprising a first connection to the system ground and a second connection to the negative terminal, the wireless transceiver configured to output a radio frequency signal, wherein the battery is configured to power the wireless transceiver;
   a first inductor comprising a first terminal and a second terminal, wherein the first terminal is connected to the system ground, and the second terminal is connected to the negative terminal, the first inductor configured to block the radio frequency signal output by the wireless transceiver, and to pass a direct current to the negative terminal;
   a first capacitor comprising a first terminal and a second terminal, wherein the first terminal is connected to the wireless transceiver, and the second terminal is connected to the negative terminal, the first capacitor configured to block the direct current to the wireless transceiver, and to pass the radio frequency signal output by the wireless transceiver; and
   a second inductor comprising a first terminal and a second terminal, wherein the first terminal is connected to the positive terminal, and the second terminal is connected to the microcontroller, the second inductor configured to block the radio frequency signal output by the wireless transceiver, and to pass the direct current from the positive terminal to the microcontroller and to the wireless transceiver;
   wherein the conductive housing is a resonant structure that is configured to resonate at a frequency of the radio frequency signal.

2. The device of claim 1, wherein the wireless transceiver is a Radio Frequency Identification (RFID) transceiver and the radio frequency signal is a first radio frequency signal, the device further comprising:
   a WiFi transceiver coupled to the system ground and configured to output a second radio frequency signal; and
   an antenna coupled to the WiFi transceiver, the antenna configured to resonate a frequency of the second radio frequency signal.

3. The device of claim 1, wherein the battery is a first battery, the conductive housing is a first conductive housing, the wireless transceiver is a first wireless transceiver, and the radio frequency signal is a first radio frequency signal, the device further comprising:
   a second wireless transceiver configured to output a second radio frequency signal; and
   a second battery connected to the second wireless transceiver, the second battery having a second conductive housing configured to resonate at a frequency of the second radio frequency signal.

4. The device of claim 1, wherein the device is configured to send or receive data using the conductive housing as an antenna.

5. A device comprising:
   a battery comprising a housing, a positive terminal, and a negative terminal, wherein the housing comprises a conductive material;
   a controller coupled to the battery;
   a wireless communication component coupled to the battery;
   a first low pass filter connected to the positive terminal and the controller, the first low pass filter configured to pass battery current and to block radio frequency signals having a first frequency;
   a second low pass filter connected to the negative terminal and the controller, the second low pass filter configured to pass the battery current and to block radio frequency signals having the first frequency; and
   a first high pass filter connected to the negative terminal and the wireless communication component, the first high pass filter configured to pass radio frequency signals having the first frequency and to block the battery current;
   wherein the housing is configured to resonate at the first frequency.

6. The device of claim 5, wherein the wireless communication component is configured to output a radio frequency signal having the first frequency.

7. The device of claim 5, wherein the battery is a first battery, the housing is a first housing, the positive terminal is a first positive terminal, and the negative terminal is a first negative terminal, the device further comprising:
   a second battery comprising a second housing, a second positive terminal, and a second negative terminal; and
   a third battery comprising a third housing, a third positive terminal, and a third negative terminal, wherein the first battery, the second battery, and the third battery are connected to the controller in parallel;
   wherein the second housing and the third housing are configured to resonate at a second frequency.

8. The device of claim 7, wherein the wireless communication component is a first wireless communication component configured to output a first radio frequency signal having the first frequency, the device further comprising:
   a second wireless communication component coupled to the controller, the second wireless communication component configured to output a second radio frequency signal having the second frequency;
   a third low pass filter connected to the first negative terminal and the second negative terminal or the third negative terminal, the third low pass filter configured to pass the battery current and to block radio frequency signals having the first frequency; and a second high pass filter connected to the second wireless communication component and the (i) second negative terminal, or (ii) third negative terminal, the second high pass filter configured to pass radio frequency signals having the second frequency and to block the battery current.

9. The device of claim 8, further comprising:
a fourth low pass filter connected to the first positive terminal and the second positive terminal, the fourth low pass filter configured to pass the battery current and to block radio frequency signals having the first frequency; and
a fifth low pass filter connected to the second positive terminal and the third positive terminal, the fifth low pass filter configured to pass the battery current and to block radio frequency signals having the second frequency.

10. The device of claim 8, wherein the first frequency is an RFID radio frequency and the second frequency is a WiFi radio frequency, and wherein the first low pass filter and the second low pass filter are inductors, filter networks, or chokes, and the first high pass filter is a capacitor.

11. The device of claim 5, wherein the battery is a first battery, the housing is a first housing, the positive terminal is a first positive terminal, and the negative terminal is a first negative terminal, the device further comprising:
a second battery comprising a second housing, a second positive terminal, and a second negative terminal; and
a third battery comprising a third housing, a third positive terminal, and a third negative terminal, wherein the first battery, the second battery, and the third battery are connected to the controller in parallel;
wherein the second housing and the third housing are configured to resonate at the first frequency.

12. The device of claim 5, wherein the wireless communication component is a first wireless communication component configured to output a first radio frequency signal having the first frequency, the device further comprising:
a second wireless communication component coupled to the controller, the second wireless communication component configured to output a second radio frequency signal having a second frequency; and
an antenna coupled to the second wireless communication component, the antenna configured to resonate at the second frequency.

13. The device of claim 5, wherein the device is configured to send or receive data using the housing.

14. The device of claim 5, wherein the battery is a first battery and the conductive housing is a first conductive housing, the device further comprising:
a second battery coupled to the first battery, the second battery comprising a second conductive housing, wherein the second conductive housing is configured to resonate at the first frequency.

15. A device comprising:
at least one processor configured to access at least one memory;
a wireless radio coupled to the at least one processor, the wireless radio configured to output one or more radio frequency signals;
a first battery comprising a first housing at least partially formed of a conductive material, the first battery coupled to the at least one processor and the wireless radio;
a capacitor connected to the wireless radio and the first battery; and
at least two inductors connected to the at least one processor and the first battery;
wherein the housing is configured to resonate at a first frequency of the one or more radio frequency signals.

16. The device of claim 15, wherein the first battery comprises a positive terminal and a negative terminal; and
wherein the at least two inductors comprises a first inductor connected to the negative terminal and the at least one processor, and a second inductor connected to the positive terminal and the at least one processor.

17. The device of claim 15, further comprising a second battery with a second housing configured to resonate at a second frequency of the one or more radio frequency signals.

18. The device of claim 15, further comprising a second battery with a second housing configured to resonate at the first frequency.

19. The device of claim 15, wherein the at least two inductors are configured to pass battery current from the first battery, and to block the one or more radio frequency signals.

20. The device of claim 15, wherein the wireless radio is a WiFi radio or an RFID radio.

* * * * *